Aug. 16, 1955  H. DODD ET AL  2,715,273
DEVICE FOR DETERMINING DIRECTION OF AN ASTRONOMICAL BODY
Filed Aug. 12, 1952

INVENTORS
HAROLD DODD
BY THOMAS D. SPENCER
Davis, Hoxie & Faithfull
THEIR ATTORNEYS

United States Patent Office 2,715,273
Patented Aug. 16, 1955

2,715,273

DEVICE FOR DETERMINING DIRECTION OF AN ASTRONOMICAL BODY

Harold Dodd and Thomas D. Spencer,
Rio de Janeiro, Brazil

Application August 12, 1952, Serial No. 303,864

1 Claim. (Cl. 33—1)

The determination of the bearing and the altitude of an astronomical body at any instant of time, at any point on the earth's surface, presents no difficulties to the astronomer, the navigator, or to any one trained technically along such lines; but to one not so trained no ready means are available wherewith to make this determination. Nevertheless, such information would be of value to many who, possibly, do not even realize how much it would help them. This is particularly true in the case of the sun.

The photographer, for example, grows more and more conscious of the artistic importance of the fall of light and shadow. Out-of-doors this usually depends upon the position of the sun. Finding himself in an unfamiliar locality, he may wish to take a picture of a building from a certain angle; but the sunlight comes from the wrong direction, or perhaps the day is overcast. At what time on a sunny day should he return to that spot to get the proper lighting?

Choosing a house or an apartment in a new environment, a man may want morning sun, or afternoon sun, in certain rooms. He might like a view of sunset, or sunrise, and thus be interested in the direction and time of day of their occurrence throughout the year.

These examples will suggest others. All such cases involve the determination of the direction of an astronomical body, at a certain place, at a certain time. The average man has neither the training nor the time to use the means available to the astronomer or the navigator; nor does he need accuracy in the same degree. We therefore provide means which are simple, quick, and whose use requires no special training. We sacrifice unnecessary accuracy to attain this end.

Figures 1, 3:
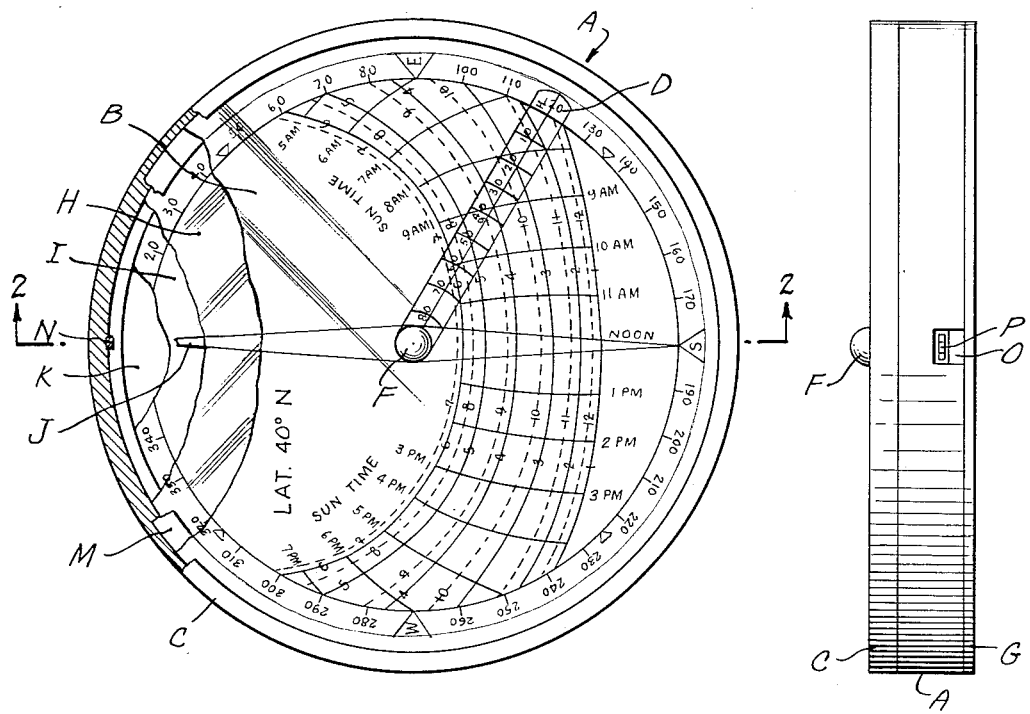
Figure 2:
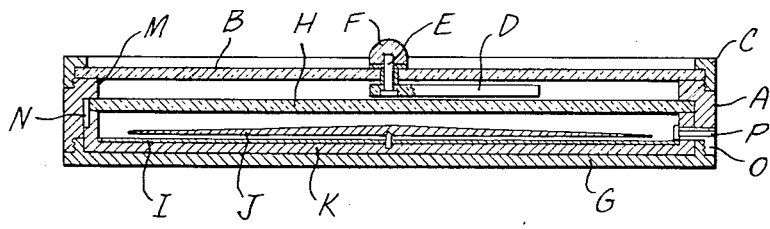

These and other objects and aspects will be apparent from the following description of a presently preferred embodiment of our invention for determining the location of the sun, which description refers to drawings wherein:

Fig. 1 is a plan view;
Fig. 2 is a section view on line 2—2 of Fig. 1; and
Fig. 3 is a side elevation view.

Referring to the drawings, a casing $a$ is fitted with a transparent cover $b$ secured in any convenient way, as by a holding-down ring $c$. Beneath the transparent cover $b$ a pointer $d$, also transparent, is secured by a pin $e$ which passes upward through the center of the cover $b$ and terminates in a knob $f$. By means of a bushing and washers, if necessary, the pointer $d$, while snugly held beneath the cover $b$, is nevertheless free to rotate with the knob $f$.

A removable base-plug $g$ permits a transparent scribed plate $h$ (fully described later) and a magnetic compass to be inserted in the casing $a$. The compass-card is shown at $i$, the compass-needle at $j$, and the compass-case at $k$. When in position, the plate $h$ is held between the top of the compass-case $k$ and a shoulder $m$ on the inside of the casing $a$. Thus the compass and the transparent plate $h$ are centered and held against axial movement, the plate forming the cover for the compass. They are held against rotation by a key on the inside of the casing $a$ which fits a key-way in the compass-case and a notch in the plate, all as shown at $n$. This also assures proper orientation of the plate $h$ with respect to the compass-card $i$. Through a small arc the casing $a$ is cut away as shown at $o$ to receive the compass-needle locking-lever $p$ and permit its operation.

The pointer $d$, the plate $h$, the compass-needle $k$ and the compass-card $i$ are thus assembled in functional relation. The cover $b$, the plate $h$ and the pointer $d$ being transparent, the compass-needle $k$ and the compass-card $i$ are visible. All parts, except the needle, should be of non-magnetic material.

Upon the plate $h$ are scribed a set of curvilinear coordinates. The curves which in Fig. 1 run from top to bottom are functions of the sun's bearing and altitude through the first day of each month of the year in the latitude of the observer. In Fig. 1 the months are indicated by numerals 1 to 12. It assists the eye if the curves for the first half of the year are distinguished from those of the second half. This may be done by scribing in different colors, or by full and dotted lines as in Fig. 1.

The curves which in Fig. 1 run from left to right indicate the hour of the day, sun time, and are so marked.

The pointer $d$ is scribed with a radial hair-line and also with concentric arcs indicating each ten degrees from the zenith (center) to the horizon-circle H. Subdivisions may be added as desired.

The scribed plate $h$ is oriented with respect to the compass-card $i$ by means of the key, key-way and notch $n$ as above described; then the noon hour-line on the plate should coincide with the north-south diameter of the compass-card; and thus, when the latter is oriented to actual north by means of the compass-needle $j$, the graduations on the compass-card $i$ will indicate actual directions. The pointer $d$ is then rotated until the hair-line passes through the appropriate intersection of hour-curve with month-curve. The pointer $d$ will then point along the sun's actual bearing which can be read on the compass-card $i$ directly below the hair-line of the pointer $d$. (In practice, the distance between compass-card and pointer should be made a minimum to reduce parallax.) The altitude of the sun is read on the pointer $d$ at the point of intersection of the hour-curve with the month-curve. Thus, for the setting shown in Fig. 1: In latitude 40 north, at 9 a. m., suntime, at the beginning of April (4th month), the sun bears approximately 120 degrees and is about 37 degrees above the horizon; or, in the beginning of December (12th month), it rises on the same bearing at about 7:30.

To plot the curves which are scribed on plate $h$ the following data are necessary: The latitude of the observer. The declination, azimuth, hour-angle and altitude of the astronomical body at chosen times throughout the day and year. Methods and means for obtaining these data are well known to those skilled in such matters. We find that for any chosen latitude and declination the remaining data can be determined quickly and with sufficient accuracy by stereographic projection: projecting on the plane of the meridian for altitude, the plane of the equator for hour-angle, and the plane of the horizon for azimuth.

With these data at hand, each bearing-curve for the plate $h$ is plotted: azimuth against altitude (with zenith at the center) for the particular declination and progressive hour-angles. Then the hour-curves are drawn through points of equal hour-angle on the several bearing curves.

The form of these curves depends in part upon the latitude of the observer. Therefore, for a latitude sufficiently removed to introduce appreciable error, a different plate with curves appropriate to the new latitude is required. The new plate is inserted by removing the base-plug $g$, the compass and the old plate $h$, then reassembling with the new plate.

Such an embodiment of our invention can be made very accurate with precision-workmanship, by minute subdivision of scales, intermediate curves, correction tables, and by increasing its size. However, having in mind uses such as those mentioned above, we not only prefer a convenient pocket size but find that utility is increased by not introducing certain factors which would be necessary in an instrument of high precision. The following examples illustrate how simplicity may be gained through an acceptable sacrifice of accuracy.

The sun reaches its most southerly declination on 21–22 December, and its most northerly on 21–22 June; but during the last two weeks of December and of June the sun's declination changes so little that the limiting month-curves in Fig. 1 have been marked for 1 January and 1 July respectively.

The compass-needle rarely points to true north; but the variation in the observer's general area can readily be learned, or it can be found by comparing the compass with a known true direction.

There is a difference between sun time and standard time depending upon the position of the observer in his time zone and upon the time of year. The observer can determine the part that depends upon his position in the time zone, remembering that 15 degrees of longitude equals one hour of time. (He will of course correct for daylight saving time.) As to the other part, on most commercial globe-maps there is an 8-shaped figure which shows the difference between sun-time and clock-time throughout the year. Except in extreme cases, the error from this latter cause is within acceptable limits of accuracy.

If the sun is shining, the observer, himself, may determine the combined effect of compass error and the difference between sun-time and clock-time. This he does by using clock-time to set the pointer $d$, pointing it along the observed bearing of the sun, and noting the difference between north on the compass-card and the north end of the compass-needle. If he knows the direction of true north (by knowing the compass error or otherwise) and orients the compass-card accordingly, he then, by moving the pointer into line with the observed bearing of the sun, can determine the correction to convert clock-time into sun-time. Conversely, if he knows the correct sun-time and sets for it, he can find the compass error.

The factors giving rise to these errors often tend to neutralize one another, and normally the combined error is within the desired accuracy. We therefore prefer simplicity to extreme accuracy, particularly since the device, itself, can be used to determine adequate correction when error becomes noticeable.

Upon the accuracy desired depends also the number of separate plates $h$ provided for different latitudes; but we find that one plate for each ten degrees of latitude is usually ample.

A further simplification would be to consider the months of March and September as equivalent with respect to the sun's declination; so also April and August, February and October, and so on. An average declination could then be used for the beginning of March and the end of September, etc.

The foregoing considerations have been mentioned to stress the relation of accuracy to the use intended. They are also pertinent to the scope of our invention.

We consider it would be within the scope of our invention were the pointer $d$ and the plate $h$, with compass points marked thereon, to comprise one assembly for use with a separate compass or without compass should the observer otherwise know the direction of north. When the astronomical body is visible, such an assembly could be used in place of a compass by setting the pointer and then pointing it along the actually observed bearing (by rotating the whole assembly); or, conversely, if the direction of north is known, and the assembly so oriented, the pointer will indicate the approximate time of day when pointed along the observed bearing.

A further modification could dispense with cover $b$, casing $a$ and base-plug $g$. The plate $h$ would then be secured to the compass-case $k$ by means such as a holding-down ring, and oriented to the compass-card by a pin on the compass-case to fit the notch in the plate $h$. The pointer $d$ would then be mounted either above or below the plate $h$ instead of on the cover $b$. The advantage would be in size and number of parts; but the pointer would have to be shifted to each new plate.

We claim:

A device for determining the direction of an astronomical body relative to an observer comprising a transparent plate on which is scribed a system of coordinates whereby each point on said plate is uniquely associated with the direction of said body at a certain time as viewed by said observer, a magnetic compass with compass-card in fixed relation to said plate and visible through said plate, and a pointer adjustably mounted in relation to said plate and scribed so that when the assembly is oriented by means of the needle of said compass and said pointer adjusted to a certain point on said plate said pointer will indicate and point along the actual bearing of said body from said observer at a certain time and at the same time indicate the altitude of said body relative to said observer.

References Cited in the file of this patent

UNITED STATES PATENTS

| | | |
|---|---|---|
| 277,799 | Smith | May 15, 1883 |
| 1,252,735 | Szabat | Jan. 8, 1918 |
| 1,258,160 | Slater | Mar. 5, 1918 |
| 2,440,827 | Marean et al. | May 4, 1948 |

FOREIGN PATENTS

| | | |
|---|---|---|
| 2,920 | Great Britain | Feb. 8, 1896 |